(12) United States Patent
Masuda et al.

(10) Patent No.: US 7,553,094 B2
(45) Date of Patent: Jun. 30, 2009

(54) LIGHT QUANTITY ADJUSTING APPARATUS, IMAGE PICKUP APPARATUS AND OPTICAL APPARATUS

(75) Inventors: Shinichi Masuda, Hachioji-chi (JP); Eriko Namazue, Edogawa-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 616 days.

(21) Appl. No.: 11/156,108

(22) Filed: Jun. 17, 2005

(65) Prior Publication Data

US 2006/0002702 A1 Jan. 5, 2006

(30) Foreign Application Priority Data

Jul. 1, 2004 (JP) ............................. 2004-195700
Dec. 27, 2004 (JP) ............................. 2004-377893

(51) Int. Cl.
  *G03B 9/02* (2006.01)
  *G03B 9/10* (2006.01)
  *H04N 5/238* (2006.01)

(52) U.S. Cl. ....................... 396/510; 396/496; 348/368; 359/739

(58) Field of Classification Search ................. 396/510, 396/220, 461, 493, 495–497; 348/367, 368; 359/739

See application file for complete search history.

(56) References Cited

U.S. PATENT DOCUMENTS

| | | | |
|---|---|---|---|
| 5,646,769 A | 7/1997 | Sato | |
| 5,646,770 A | 7/1997 | Sato | |
| 5,749,015 A | 5/1998 | Sato | |
| 6,099,171 A | 8/2000 | Takahashi | |
| 2005/0073604 A1 | 4/2005 | Umezu | |

FOREIGN PATENT DOCUMENTS

| | | |
|---|---|---|
| JP | 6-95204 A | 4/1994 |
| JP | 6-175194 A | 6/1994 |
| JP | 11-119296 A | 4/1999 |
| JP | 2000-155352 A | 6/2000 |
| JP | 2001-42382 | 2/2001 |
| JP | 2004-138953 A | 5/2004 |

*Primary Examiner*—Rochelle-Ann J Blackman
(74) *Attorney, Agent, or Firm*—Canon U.S.A., Inc. I.P. Division

(57) ABSTRACT

At least one exemplary embodiment is directed to a light quantity adjusting apparatus that can include a first blade member configured to be driven by a drive source, such as a motor, and a second blade member whose movement is configured to be related to the movement of the first blade member.

3 Claims, 11 Drawing Sheets

LIGHT QUANTITY ADJUSTING APPARATUS, IMAGE PICKUP APPARATUS AND OPTICAL APPARATUS

BACKGROUND OF THE INVENTION

1. Field of the Invention

The present invention relates to a light quantity adjusting apparatus. More particularly, but not exclusively, the present invention relates to a plural blade diaphragm light quantity adjusting apparatus.

2. Description of the Related Art

With the recent miniaturization of image pickup apparatuses (e.g., video and still cameras), imaging optical systems, for example those mounted on image pickup apparatuses, have also been miniaturized. Often the miniaturization of the imaging optical system leads to miniaturization of any lens units in the imaging optical system. A light quantity adjusting apparatus is often associated with these systems and is used to control light into the lens unit. Thus, as the lens unit is miniaturized so also is the light quantity adjusting apparatus.

For example, Japanese Patent Laid-Open No. 6-175194 discusses a conventional light quantity adjusting apparatus for use in an image pickup apparatus, such as a still camera and a video camera. This apparatus comprises plural diaphragm blades, each of which has a rotation shaft and an operating shaft, and also comprises a diaphragm ring that has cam grooves and a central opening. This apparatus engages the operating shaft of each of the plural diaphragm blades with a corresponding one of the cam grooves and also rotates the diaphragm ring to thereby simultaneously operate the diaphragm blades.

Japanese Patent Laid-Open No. 6-95204 discusses another conventional light quantity adjusting apparatus. This apparatus dispenses with the diaphragm ring and is configured so that each of plural diaphragm blades includes a cam groove and a cam groove engaging pin, and that the cam groove engaging pin of each diaphragm blade is slidably engaged with the cam groove of an adjacent diaphragm blade. The plural diaphragm blades are sequentially driven by a driving force transmitted from a drive member to each diaphragm blade.

Japanese Patent Laid-Open No. 2000-155352 discusses another conventional light quantity adjusting apparatus. This apparatus is configured so that an ND (Neutral Density) filter is bonded to each of a part of diaphragm blades, as used in a video camera which incorporates a CCD (Charge-Coupled Device) image sensor, and that when the diameter of a diaphragm aperture, defined by the diaphragm blades, is equal to or less than a predetermined value, the ND filter is inserted into the diaphragm aperture. When the diameter of the diaphragm aperture is reduced too much, thus an image sensor used in an image pickup section becomes relatively small, diffraction can adversely affect a picked-up image. Therefore, this apparatus employs the ND filter to thereby eliminate necessity for decreasing the diameter of the diaphragm aperture to be less than the predetermined value.

In a case where the plural blades are operated together by the diaphragm ring, backlash can be caused between the drive source and the diaphragm ring and between the diaphragm ring and each of the blades. Also, a loss in transmitting a driving force can increase due to friction generated in the cam grooves of the diaphragm ring. In the apparatus adapted to operate the sequentially connected diaphragm blades, backlash between engaging portions of the adjacent blades can be accumulated. Thus, it is difficult to enhance the accuracy of the diameter of the diaphragm aperture.

Also, the light quantity adjusting apparatus having the ND filter uses a dedicated power supply so as to control the ND filter independently. Consequently, the size of this apparatus increases.

Thus, there has been proposed an apparatus adapted to cause the diaphragm ring to operate a blade, which includes the ND filter, similarly to diaphragm blades. However, backlash between the diaphragm ring and the blade, which includes the ND filter, increases. Also, the loss in transmitting a driving force increases due to friction generated in the cam grooves.

Naturally, the use of the diaphragm ring increases the thickness of the entire apparatus.

Generally, many apparatuses are configured to drive two diaphragm blades and an ND filter through a seesaw type drive lever, which are used as a light quantity adjusting apparatus mounted on a video camera. The drive lever is driven by an electromagnetic actuator (or motor) serving as a drive source. There are two types of the ND filter. One type is stuck to one of the diaphragm blades by an adhesive agent. The other type serves as an independent separate member and is driven by a dedicated drive member. A light quantity adjusting apparatus having an ND filter of the latter type, as disclosed in Japanese Patent Laid-Open No. 2004-138953, is described with reference to FIG. 8.

FIG. 8 illustrates an exploded perspective view of a conventional light quantity adjusting apparatus 30.

In FIG. 8, reference numeral 32 designates a bottom board (that is, a casing) which includes a fixed opening 32f through which light passes. Reference numerals 35 and 36 denote diaphragm blades serving as light shielding members for shielding light, which can pass through the fixed opening 32f. Reference numeral 31 designates a rotary electromagnetic actuator (or motor) for driving the diaphragm blades 35 and 36 through a seesaw type diaphragm drive lever 33. Reference numeral 37 denotes an ND blade to which an ND filter 37a is stuck. Reference numeral 34 designates an ND drive lever for driving the ND blade 37.

The ND drive lever 34 has a laterally elongated hole 34a that engages with a projection 33a of the diaphragm drive lever 33, and also has an upwardly and downwardly elongated hole 34b that engages with projections 32d and 32e formed on the bottom board 32. Each of the diaphragm blades 35 and 36 has a corresponding one of laterally elongated holes 35a and 36a, which respectively engage with projections 33a and 33b formed on the diaphragm drive lever 33, and also has a corresponding one of upwardly and downwardly elongated holes 35b and 36b, which respectively engage with projections 32a and 32b formed on the bottom board 32. The ND blade 37 has a hole 37b, which is fitted onto a projection 32c of the bottom board 32, and also has an elongated hole 37c that engages with a projection 34c of the ND drive lever 34.

With this configuration, the diaphragm blades 35 and 36 are guided to the projections 32a and 32b of the bottom board 32, respectively, in response to a rotation of the diaphragm drive lever 33 driven by the motor 31. Then, the diaphragm blades 35 and 36 perform reciprocating motions in upward and downward directions of the light quantity adjusting apparatus 30, as viewed in this figure. Consequently, the diaphragm blades 35 and 36 move up and down in the region of the fixed opening 32f formed in the bottom board 32, to thereby substantially change the size of the fixed opening 32f. Thus, a quantity of light passing through the fixed opening 32f can be changed. In this apparatus of the aforementioned configuration, the ND drive lever 34 is guided by the projections 32d and 32e of the bottom board 32 in response to a rotation of the diaphragm lever 33 driven by the motor 31. Then, the ND drive lever 34 performs reciprocating motions in the upward and downward directions of the light quantity adjusting apparatus 30, so that the ND blade 37 rotates around the projection 32c of the bottom board 32.

That is, the two diaphragm blades 35 and 36 and the ND blade 37 are driven by a single drive source (the motor 31).

Other conventional light quantity adjusting apparatuses, each of which has four blades as disclosed in Japanese Patent Laid-Open Nos. 11-119296 and 2001-42382, are described hereinbelow by referring to FIGS. 9A and 9B, and FIGS. 10A and 10B.

FIGS. 9A and 9B illustrate explanatory views of another conventional light quantity apparatus 40. FIG. 9A illustrates an exploded perspective view of the apparatus 40. FIG. 9B illustrates a plan view of the apparatus 40 in a shutter closed state in which a case cover is removed.

In FIGS. 9A and 9B, reference numeral 41 designates a case serving as a supporting member. Reference numeral 42 denotes a case cover. Reference numerals 43, 44, 45, and 46 designate four sectors turnable in an opening and closing directions, that is, a first main blade (43), a first auxiliary blade (44), a second main blade (45), and a second auxiliary blade (46), respectively, in this order. Reference numeral 47 denotes a drive lever having a drive pin 47a. In the shutter closed state shown in FIG. 9B, each of the blades is held by a projection 42g, which is provided on the turn locus of the main blade 45 of the case cover 42, and a projection 41g, which is provided on the turn locus of the main blade 45 of the case 41, in a state in which the gap between the adjacent blades is more even and small. Consequently, a favorable light shielded condition is achieved. In the driving interval from the shutter closed state to a shutter opened state, the main blades 43 and 45 are released from the projections 42g and 41g, respectively, so that a drive load is reduced. This enables smooth opening and closing of a shutter.

FIGS. 10A and 10B illustrate explanatory views of another conventional light quantity apparatus 50. FIG. 10A illustrates an exploded perspective view of the apparatus 50. FIG. 10B illustrates a plan view of the apparatus 50 in an initial closed state.

In FIGS. 10A and 10B, reference numeral 51 designates shutter blades. The apparatus 50 has two outer blades 51a and 51d and two inner blades 51b and 51c. Reference numeral 59 denotes a photoreflector for detecting the positions of the shutter blades 51.

The outer blades 51a and 51b differ in turn-direction from the inner blades 51b and 51c. These shutter blades 51 are placed in such a way as to differ in the center of turn from one another. A slit is provided in an end part of each of the outer blade 51d and the inner blade 51c. In the initial state shown in FIG. 10B, in which the shutter blade 51d is closed, sensor light traveling between a light transmitting section and a light receiving section of the photoreflector 59 is blocked by the end parts of the shutter blades 51d and 51c. Abnormality is detected before exposure when the sensor light of the photoreflector 59 momentarily passes through the slit before the corresponding blade reaches a position, at which a flux of imaging light starts passing therethrough, while the shutter blades 51 move in the opening directions.

As described above, with reference to FIGS. 9A, 9B, 10A, and 10B, each of the conventional light quantity adjusting apparatuses 40 and 50 has the four blades and drives these blades (e.g., by using one drive source) so that the blades rotate around axes of rotation thereof, respectively. Incidentally, in each of the light quantity adjusting apparatuses 40 and 50, the number of the diaphragm blades is set to be larger than that of the diaphragm blades of the light quantity adjusting apparatus 30. Also, the size of each of the blades is decreased to thereby reduce the projected area thereof.

However, the conventional light quantity adjusting apparatus 30 shown in FIG. 8 uses a dedicated drive lever 34 so as to drive the ND blade 37. Thus, the number of components increases, so that the cost of the apparatus increases. Also, the thickness in the direction of an optical axis of the apparatus is increased by ensuring a space for the drive lever 34.

In the conventional light quantity adjusting apparatus 40 shown in FIGS. 9A and 9B, the first and second main blades 43 and 45 respectively turn ahead of the first and second auxiliary blades 44 and 46 during the transition from the closed state to the opened state. Thus, this apparatus cannot provide to the first and second auxiliary blades 44 and 46 functions that are other than a light shielding function, for example, a function of alleviating image deterioration due to the diffraction of light, which is caused in the case of the small diaphragm aperture.

The conventional light quantity adjusting apparatus 50 shown in FIGS. 10A and 10B cannot realize a completely closed state unless all the four shutter blades 51, that is, the outer blades 51a and 51d and the inner blades 51b and 51c are used. Consequently, this apparatus cannot provide to the shutter blades 51 functions that are other than the light shielding function and that are, for example, the function of alleviating image deterioration due to the diffraction caused in the case of the small diaphragm aperture.

SUMMARY OF THE INVENTION

At least one exemplary embodiment is directed to a light quantity adjusting apparatus that drives a plurality of blades by utilizing power supplied from a drive source.

At least one exemplary embodiment is directed to an image pickup apparatus having a light quantity adjusting apparatus in accordance with exemplary embodiments.

At least one further exemplary embodiment is directed to an optical apparatus having the light quantity adjusting apparatus.

At least one other exemplary embodiment is directed to a light quantity adjusting apparatus that comprises a first blade member configured to be driven by a drive source (e.g., a motor), and a second blade member having an engaging portion to be engaged with the first blade member, the second blade member movement related to the movement of the first blade member.

Accordingly another exemplary embodiment is directed to an image pickup apparatus having a light quantity adjusting apparatus in accordance with at least one exemplary embodiment.

Accordingly another exemplary embodiment is directed to an optical apparatus having a light quantity adjusting apparatus in accordance with at least one exemplary embodiment.

Further features of the present invention will become apparent from the following description of exemplary embodiments (with reference to the attached drawings).

BRIEF DESCRIPTION OF THE DRAWINGS

FIG. 7A illustrates the opened state. FIG. 7B illustrates a first stage of change to the closed state. FIG. 7C illustrates a second stage of change to the closed state. FIG. 7D illustrates a third stage of change to the closed state. FIG. 7E illustrates the closed state.

FIG. 9A illustrates an exploded perspective view of this apparatus. FIG. 9B illustrates a plan view of this apparatus in a shutter closed state in which a case cover is removed.

FIG. 10A illustrates an exploded perspective view of this apparatus. FIG. 10B illustrates a plan view of this apparatus in an initial closed state.

DETAILED DESCRIPTION OF THE EMBODIMENTS

The following description of at least one of the possible exemplary embodiment(s) is merely illustrative in nature and is in no way intended to limit the invention, its application, its equivalents, or uses.

Processes, techniques, apparatus, and materials as known by one of ordinary skill in the art may not be discussed in detail but are intended to be part of the enabling description where appropriate. For example some examples of blade configurations and engagement pins are discussed, equivalents and other blade configurations and engagement pin placement as known by one of ordinary skill in the relevant arts are intended to be included in the scope of at least a few exemplary embodiments.

Additionally the actual size of blades may not be discussed however any size from macro to micro and nano sized blades are intended to lie within the scope of exemplary embodiments (e.g. blades with characteristic sizes of nanometer size, micro size, centimeter, and meter sizes).

Additionally exemplary embodiments are not limited to visual optical systems, for example the system can be designed for use with infrared and other wavelength systems. For example an infrared light detector (e.g., a detector measuring infrared markings).

A light quantity adjusting apparatus according to an exemplary embodiment can be used for changing the quantity of incident light impinging upon an image sensor, (e.g., a CCD image sensor or a CMOS (Complementary Metal-Oxide Semiconductor) image sensor). The image sensor can be arranged on an optical path of an image pickup apparatus (e.g., of a still camera or a video camera), which receives light coming from an object and also forms an image signal. Alternatively, the light quantity adjusting apparatus according to an exemplary embodiment can be used for blocking the incident light. Also, the light quantity adjusting apparatus according to an exemplary embodiment can be mounted on an optical apparatus, which can have a lens barrel attachable to an image pickup apparatus, and can be used for adjusting the quantity of light passing through this optical apparatus.

Figure 11:
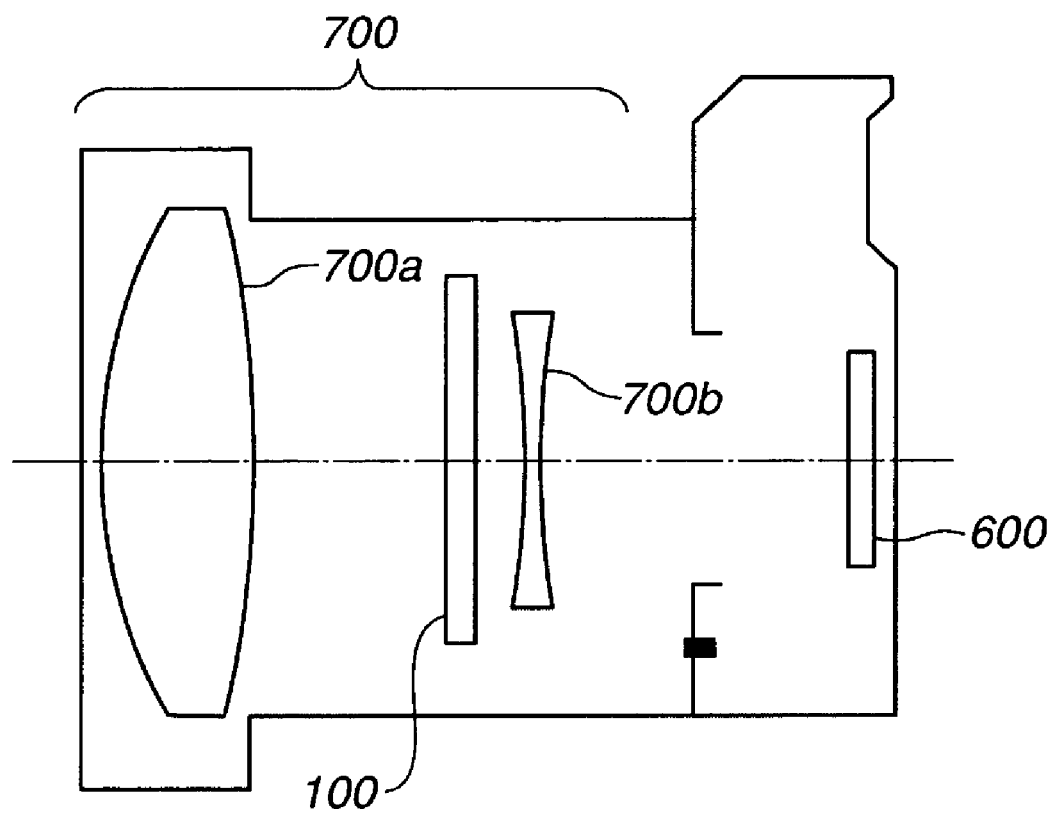
FIG. 11 illustrates a schematic view of an example of an image pickup apparatus on which the light quantity adjusting apparatus, according to at least one exemplary embodiment, can mounted.

Hereinafter, the light quantity adjusting apparatus according to at least one exemplary embodiment is described by taking a digital still camera as a non-limiting example of an image pickup apparatus. FIG. 11 illustrates a schematic view of an image pickup apparatus, used as a non-limiting example, on which the light quantity adjusting apparatus is mounted in the descriptions that follow. Reference numeral 100 designates a light quantity adjusting apparatus. Reference numeral 600 denotes an image sensor, (e.g., a CCD image sensor a CMOS image sensor, equivalents and other image sensors as known by one of ordinary skill in the relevant art), which can have a photoelectric converting function. Reference numeral 700 designates a lens apparatus (that is, an optical apparatus) having a lens barrel detachable from the body of the digital still camera. In FIG. 11, for convenience of drawing, the lens apparatus 700 is shown in such a way as to have only two lenses 700*a* and 700*b*. However, actually, the lens apparatus 700 can have any number of lenses, e.g., a large number of lenses. The light quantity adjusting apparatus 100 can be disposed between the lenses. The image sensor 600 can output an image signal when receiving a flux of light having passed through the lenses 700*a* and 700*b* of the light quantity adjusting apparatus 700. Incidentally, in at least one exemplary embodiment of an applicable image pickup apparatus, the lens apparatus 700 may be operatively connected to the body of the digital still camera and may be unable to be detached therefrom.

Hereunder, exemplary embodiments are described in detail by referring to the accompanying drawings.

First Exemplary Embodiment

FIGS. 1A to 1D and 2 illustrate views of an operation of a light quantity adjusting apparatus according to a first exemplary embodiment.

Figure 1A:
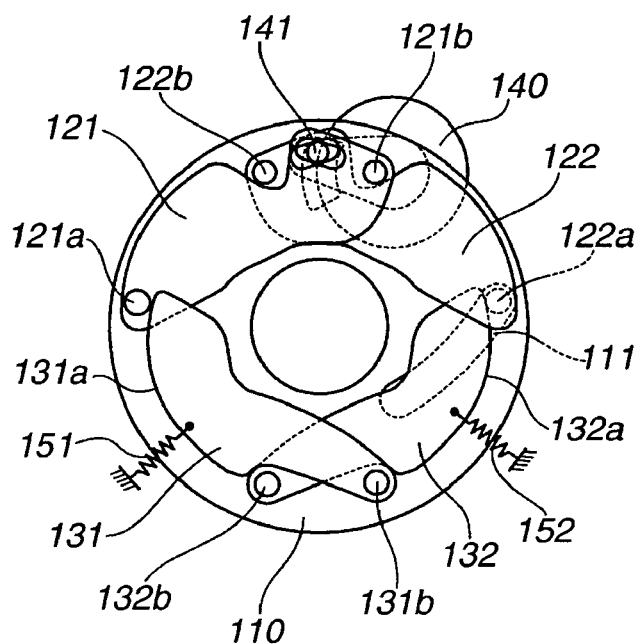
FIGS. 1A to 1D illustrate the operation of a light quantity adjusting apparatus according to a first exemplary embodiment.
Figure 1B:
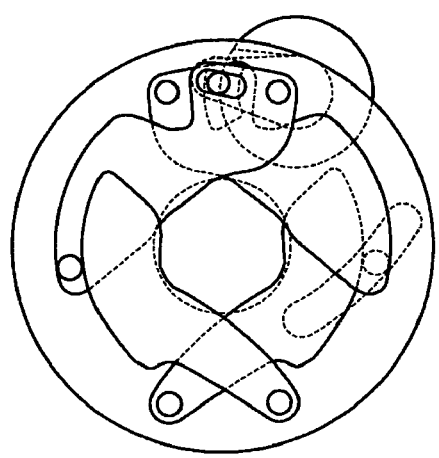
Figure 1C:
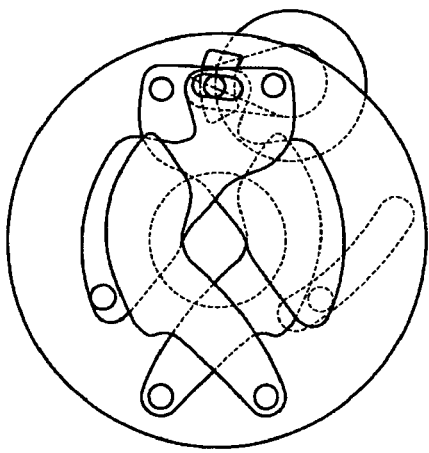
Figure 1D:
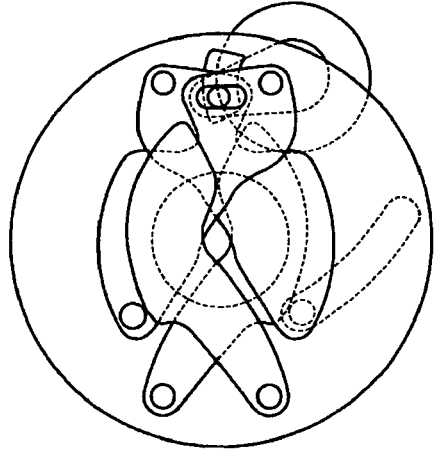
Figure 2:
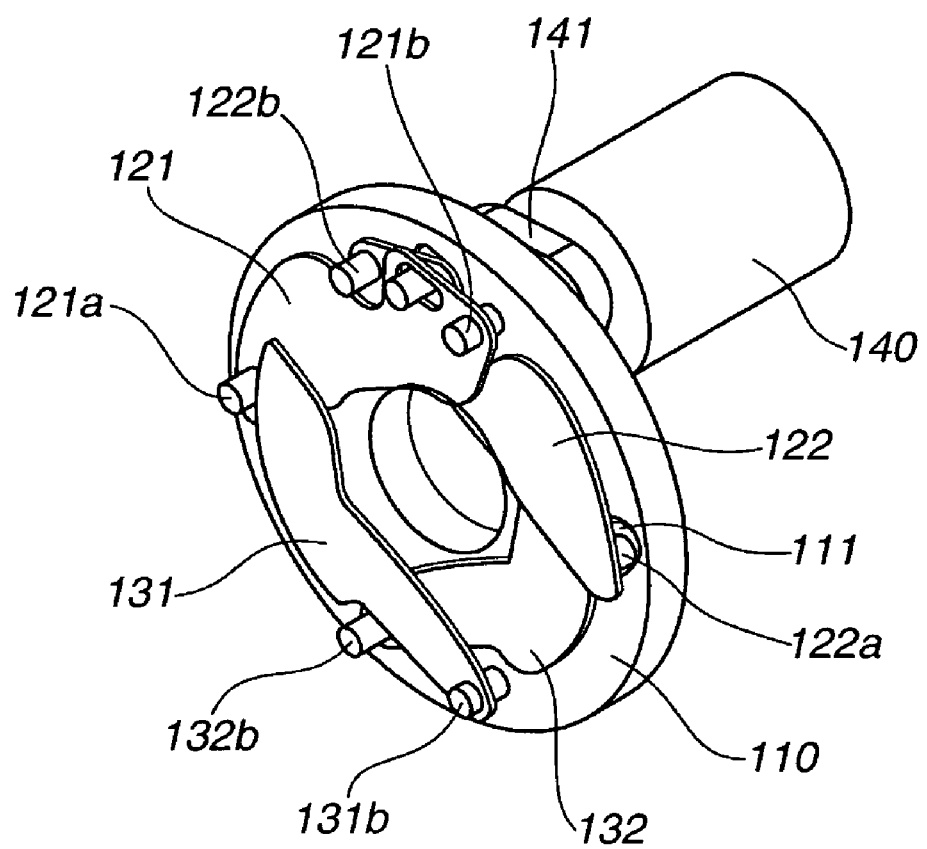
FIG. 2 illustrates a perspective view of a light quantity adjusting apparatus according to the first exemplary embodiment.

FIG. 1A illustrates a top view of the light quantity adjusting apparatus adapted so that the diameter of a diaphragm aperture, defined by the diaphragm blades, is increased. FIG. 1B illustrates a top view of the light quantity adjusting apparatus at the start of narrowing the aperture. FIG. 1C illustrates a top view of the light quantity adjusting apparatus in a case where the aperture is narrowed still more form that shown in FIG. 1B. FIG. 1D illustrates a top view of the light quantity adjusting apparatus in which the diameter of the aperture is reduced by narrowing the aperture. FIG. 2 illustrates a perspective view of the light quantity adjusting apparatus adapted so that the diameter of the aperture, defined by the diaphragm blades, is increased.

In the light quantity adjusting apparatus according to the first exemplary embodiment, an electromagnetic drive source 140, (e.g., a stepping motor), is disposed on one side of a diaphragm bottom board 110 having an aperture provided in the central part thereof. A first group of blades 121 and 122 and a second group of blades 131 and 132 are disposed on the other side of the board 110. The blades 132, 122, 121, and 131 are overlapped on the bottom board 110 in this order, however in other exemplary embodiments the orders could be varied. A cover board (not shown) is overlapped on the blade 131. A space, in which the blades 121, 122, 131, and 132 move, is secured between the cover board and the bottom board 110.

Each of the blades 121, 122, 131, and 132 is disposed in such a manner as to be able to rotate around a corresponding one of supporting pins 121b, 122b, 131b, and 132b with respect to the bottom board 110. A pair of the supporting pins 121b and 122b for the first group of blades and another pair of the supporting pins 131b and 132b for the second group of blades are provided across the aperture of the bottom board 110.

A drive lever 141 is connected to an electromagnetic drive source 140. An end of the drive lever 141 penetrates through an elongated hole provided in the bottom board 110 and is fitted into an elongated hole provided in each of the first group of blades 121 and 122. The drive lever 141 performs reciprocating motions in a place located between the supporting pins 121b and 122b. When the drive lever 141 moves toward the center of the bottom board 110, the blades 121 and 122 are turned to thereby reduce the diameter of the aperture defined by the inner edges of the blades 121, 122, 131, and 132.

The blades 121 and 122 of the first group can be formed of various materials (e.g., plastic-molded, metallic) and can be formed integrally with engaging pins 121a and 122a, respectively. The engaging pin 122a can be shaped in such a way as to protrude toward the bottom board 110. A groove 111 provided in the bottom board 110 is a run-off groove for the engaging pin 122a. The engaging pin 121a is shaped in such a manner as to protrude in a direction opposite to the bottom board 110. In other exemplary embodiment, if the order of blades is varied so can the direction of the engaging pins 121a and 122a be varied. A run-off groove, which is similar to the groove 111 of the bottom board 110, is provided in the cover board (not shown).

As shown in FIG. 1A, each of elastic members 151 and 152 (e.g., springs), is engaged with a corresponding one of the blades 131 and 132 of the second group and has a pushing force acting in a direction in which the corresponding blade 131 or 132 is opened. An outer edge 131a of the blade 131 and an outer edge 132a of the blade 132 abut against the engaging pins 121a and 122a of the blades 121 and 122 of the first group, respectively.

When the electromagnetic drive source 140 is energized, so that the drive lever 141 is turned anticlockwise (that is, driven toward the center of the bottom board 110), the blades 121 and 122 of the first group start moving in narrowing directions. Simultaneously, while the blades 131 and 132 of the second group are respectively caused by the elastic members 151 and 152 to generally be forced toward the engaging pins 121a and 122a, the blades 131 and 132 start moving in the narrowing directions against the pulling forces of the elastic members 151 and 152, by the application of pushing forces exerted by the engaging pins 121a and 122a. When the drive lever 141 is turned clockwise (that is, driven in a direction away from the center of the bottom board 110), the blades 121 and 122 rotate in opposite directions, respectively, and start moving in opening directions. Simultaneously, the blades 131 and 132 of the second group rotate in the opposite directions and move in the opening directions, while the blades 131 and 132 are respectively caused by the pulling forces of the elastic members 151 and 152 to proceed toward the engaging pins 121a and 122a.

Thus, the elastic members 151 and 152 provide the pulling forces to the blades 131 and 132 of the second group so that these blades move in the opening directions and abut against the blades 121 and 122 of the first group, respectively. Consequently, when the blades 121 and 122 of the first group are driven, the blades 131 and 132 of the second group follow the movement of the blades of the first group, respectively. Thus, the blades 131 and 132 of the second group can be also driven.

The blades 131 and 132 of the second group are disposed at positions opposed to the blades 121 and 122 of the first group, respectively. Thus, as illustrated in FIGS. 1B, 1C, and 1D, the diaphragm aperture can be narrowed in such a way as to be substantially symmetrical with respect to an optical axis. The supporting pins 131b and 132b of the second group of blades are disposed more distantly from the supporting pins 121b and 122b than the engaging pins 121a and the 122a, respectively. This facilitates the uniform change of the aperture defined by the blades. Also, the first exemplary embodiment has two paths through which a driving force generated by the electromagnetic drive source 140 is transmitted from the first group of blades 121 and 122 to the second group of blades 131 and 132. That is, this exemplary embodiment has a path extending through the engaging pin 121a, and another path extending through the engaging pin 122a. Consequently, this embodiment can reduce the accumulation of backlash caused between the engaging portions of the blades, as compared with the case of transmitting the driving force in one direction to the connected blades.

In at least one exemplary embodiment the engaging pins 121a and 122a are not formed integrally with the blades 121 and 122, respectively, and further can be manufactured by using metallic shafts, which can be separate parts, and can be fixed to the blades (e.g., by caulking, glue, screwing, other fastening methods).

Second Exemplary Embodiment

FIGS. 3A to 3E illustrate views of an operation of a light quantity adjusting apparatus according to a second exemplary embodiment. In the second exemplary embodiment, the diaphragm blades, which vary the diameter of the aperture, and a blade serving as an ND filter are operated by a same drive source.

Figure 3A:
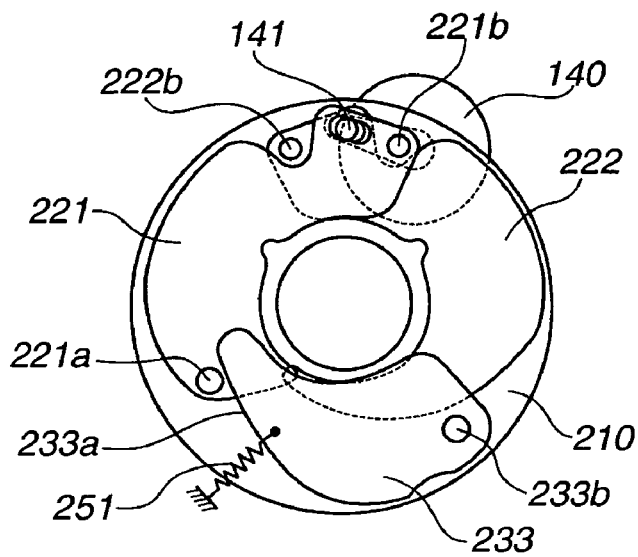
FIGS. 3A to 3E illustrate the operation of a light quantity adjusting apparatus according to a second exemplary embodiment.
Figure 3B:
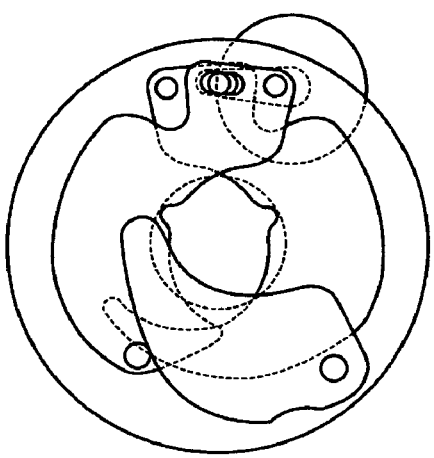
Figure 3C:
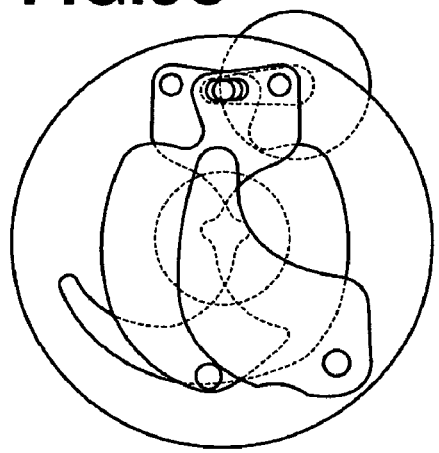
Figure 3D:
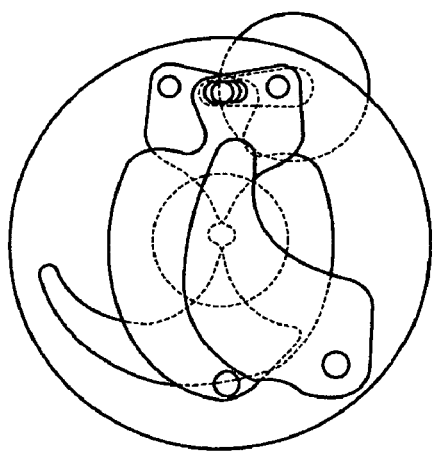
Figure 3E:
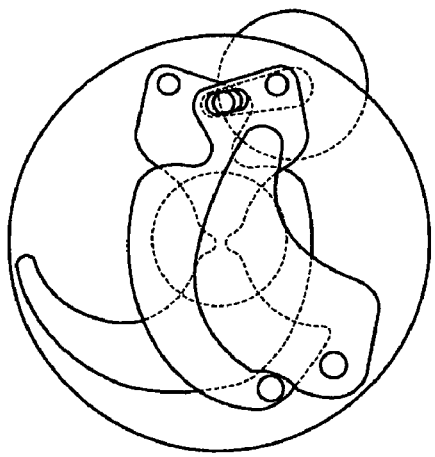

FIG. 3A illustrates a top view of the light quantity adjusting apparatus adapted so that the diameter of the aperture defined by the diaphragm blades 221 and 222 is increased. FIG. 3B illustrates a top view of the light quantity adjusting apparatus at the start of narrowing the aperture. FIG. 3C illustrates a top view of the light quantity adjusting apparatus in a state in which the aperture, formed by blades 221 and 222, is narrowed still more as compared with the similar aperture shown in FIG. 3B. FIG. 3D illustrates a top view of the light quantity adjusting apparatus in a state in which the aperture, formed by blades 221 and 222 and as covered by ND filter 233, is narrowed still more as compared with the similar aperture shown in FIG. 3C. FIG. 3E is a top view of the light quantity adjusting apparatus in a state in which the aperture is completely closed as a result of narrowing.

The light quantity adjusting apparatus according to the second exemplary embodiment can be configured so that as the diameter of the aperture, defined by the diaphragm blades 221 and 222, is reduced, the ND filter 233 goes into the aperture.

The electromagnetic drive source 140 and the drive lever 141 of the second embodiment are similar to those of the first embodiment. The blades 221 and 222 of the first group of the second exemplary embodiment can differ in shape from those of the first exemplary embodiment, and are formed so that the diameter of the diaphragm aperture can be adjusted using only two blades (e.g. 221 and 222), although in other exemplary embodiment more blades can be used. Incidentally, an engaging pin is provided only in the blade 221, although in other exemplary embodiments other engagement pin placement can be provided. In yet another exemplary embodiment, ND Filter 233 is removed and the elastic member attached to blade 222, which can be varied in shape such that the engaging pin 221a presses on blade 222 in a narrowing operation, and the ND filter portion is built into both blade 221 and 222. Additionally the reconfigured blade 222, containing a built in ND filter, can be reshaped such that one blade is actively driven by the drive source 140.

The diaphragm blades 222 and 221 are overlapped on the bottom board 210 in this order. The ND filter 233 is overlapped on the blade 221. The ND filter 233 is disposed in such a way as to be able to rotate around a supporting pin 233b with respect to the bottom board 210. In other exemplary embodiments the order can be changed.

As illustrated in FIG. 3A, an elastic member 251 having a pulling force acting in a direction away from the center of the bottom board 210, in which the ND filter 233 retreats from the aperture of the bottom board, is engaged with the ND filter 233. When the diameter of the aperture, defined by the blades 221 and 222, is increased to a predetermined value, the ND filter 233 is held by a stopper (not shown) at a place at which a small gap is provided between an outer edge 233a of the ND filter 233 and the engaging pin 221a of the blade 221. A delay of the start of moving the ND filter 233 from the start of moving the first group of blades 221 and 222 can freely be set by adjusting the size of the gap between the outer edge 233a of the ND filter 233 and the engaging pin 221a of the blade 221 while the electromagnetic drive source 140 is not energized.

When the electromagnetic drive source 140 is energized, so that the drive lever 141 is turned anticlockwise (that is, driven toward the center of the bottom board 210), the blades 221 and 222 of the first group rotate in opposite directions and start moving in narrowing directions. Simultaneously, the engaging pin 221a is brought into contact with the outer edge 233a of the ND filter 233. Also, the ND filter 233 starts moving in a direction, in which the ND filter 233 goes into the aperture, against the pulling force of the elastic member 251.

In a state shown in FIG. 3B, a part of the ND filter 233 goes into the diaphragm aperture defined by the first group of blades 221 and 222. However, the diameter of the aperture is sufficiently large. Thus, the diffraction of light on an end surface of the ND filter 233 has little influence on an image. In a state shown in FIG. 3C, a small diaphragm aperture is defined by the first group of blades 221 and 222. This diaphragm aperture is completely covered with the ND filter 233. Thus, the diffraction of light on an end surface of the ND filter 233 has no influence on an image.

In a state shown in FIG. 3D, the diameter of the diaphragm aperture defined by the first group of blades 221 and 222 is reduced still more. The ND filter 233 covers the entire aperture.

In a state shown in FIG. 3E, the aperture is completely covered with the first group of blades 221 and 222.

Thus, the ND filter 233 can optionally be inserted into the diaphragm aperture by appropriately setting the shapes of the engaging pin 221a of the blade 221 and the outer edge 233a of the ND filter 233.

Incidentally, it is possible that the effective portion of the ND filter 233 is constituted by an ND filter material, instead of constituting the entire ND filter 233 by an ND filter material, and is stuck onto the blades 222 and/or 221 (e.g., by bonding).

Third Exemplary Embodiment

FIGS. 4A to 4E illustrate views of an operation of a light quantity adjusting apparatus according to a third exemplary embodiment.

Figure 4A:
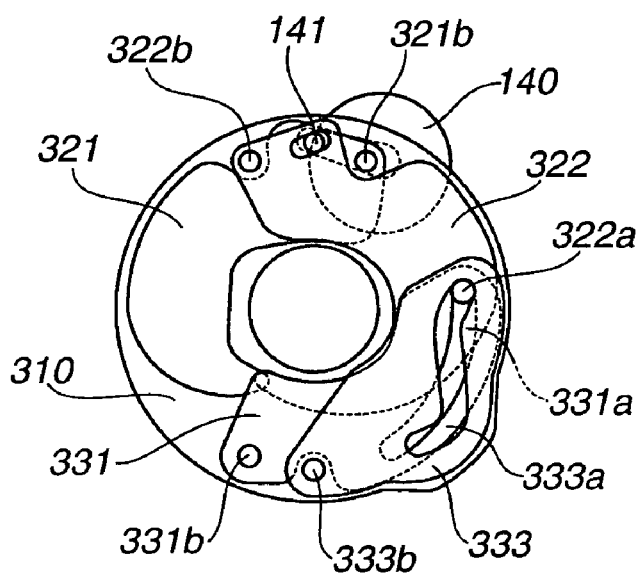
FIGS. 4A to 4E illustrate the operation of a light quantity adjusting apparatus according to a third exemplary embodiment.
Figure 4B:
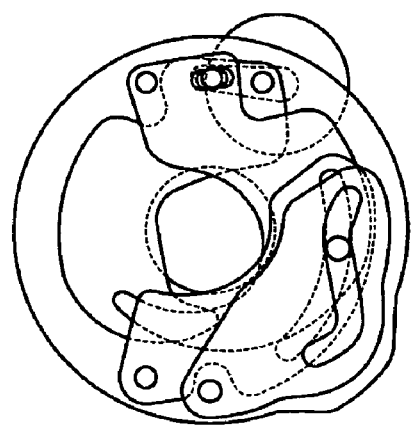
Figure 4C:
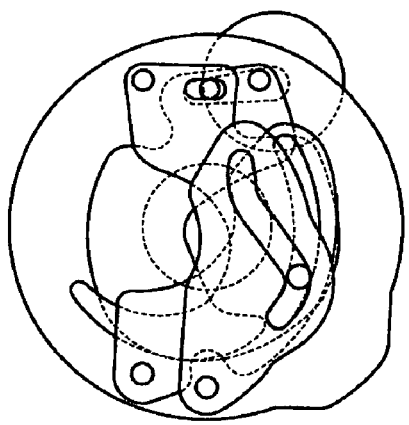
Figure 4D:
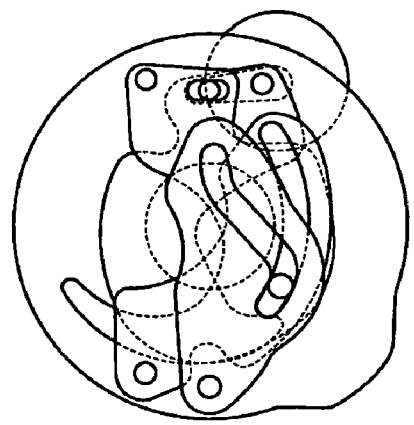
Figure 4E:
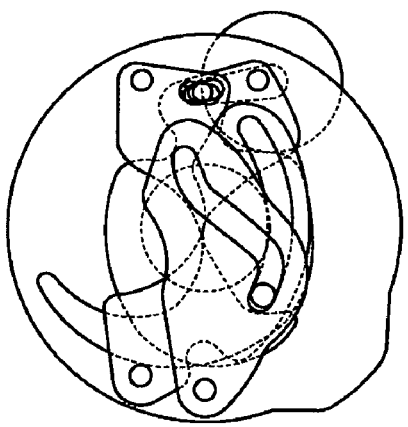

FIG. 4A illustrates a top view of the light quantity adjusting apparatus adapted so that the diameter of the aperture, defined by the diaphragm blades, is increased. FIG. 4B illustrates a top view of the light quantity adjusting apparatus at the start of narrowing the aperture. FIG. 4C illustrates a top view of the light quantity adjusting apparatus in a state in which the aperture is narrowed still more as compared with the aperture shown in FIG. 4B. FIG. 4D illustrates a top view of the light quantity adjusting apparatus in a state in which the aperture is narrowed still more as compared with the aperture illustrated in FIG. 4C. FIG. 4E illustrates a top view of the light quantity adjusting apparatus in a state in which the aperture is completely closed as a result of narrowing.

Similar to the second exemplary embodiment, the light quantity adjusting apparatus according to the third exemplary embodiment is configured so that as the diameter of the aperture, defined by the diaphragm blades, is reduced, the ND filter goes into the aperture.

The electromagnetic drive source 140 and the drive lever 141 of the third exemplary embodiment are similar to those of the first exemplary embodiment. The blades 321 and 322 of the first group of the third exemplary embodiment can differ in shape from those of the first exemplary embodiment, and are formed so that the diameter of the diaphragm aperture can be adjusted using only two blades (e.g. 321 and 322), although in other exemplary embodiments more than two blades can be used. Incidentally, an engaging pin is provided only in the blade 322 in the exemplary embodiment shown, although other engagement pin placements are possible in other exemplary embodiments.

The diaphragm blades 322 and 321 are overlapped on the bottom board 310 in this order. Also, a second blade 331 is overlapped on the blade 322. Also, an ND filter 333 is overlapped on the second blade 331. An engaging pin 322a (e.g., plastic-molded) can be integrally attached with blade 322 in such a way as to protrude opposite to the bottom board 310. Other exemplary embodiments can change the order of the blades and any engaging pin. As illustrated in FIG. 4A, the engaging pin 322a is fitted into both elongated-hole-like driven parts 331a and 333a respectively provided in the second blade 331 and the ND filter 333. Each of the second blade 331 and the ND filter 333 can be rotatably supported by a corresponding one of supporting pins 331b and 333b, which are respectively opposed to supporting pins 321a and 322a across the aperture of the bottom board 310.

When the blade 322 turns, the engaging pin 322a moves in the driven parts 331a and 333a. The positions of the second blade 331 and the ND filter 333 are uniquely determined by the position of the engaging pin 322a placed in the driven parts 331a and 333a. The movement of each of the second blade 331 and the ND filter 333 can freely be set by appropriately shaping the driven parts 331a and 333a.

When the electromagnetic drive source 140 is energized, so that the drive lever 141 is turned anticlockwise (that is, driven toward the center of the bottom board 310), the blades 321 and 322 of the first group rotate in opposite directions and start moving in narrowing directions. Simultaneously, the second blade 331 and the ND filter 333, which are engaged with the engaging pin 322a, start moving in a direction, in which the second blade 331 and the ND filter 333 are going to cover the aperture.

In a state illustrated in FIG. 4B, a diaphragm aperture is defined by three blades, that is, the blades 321 and 322 of the first group and the second blade 331.

In a state illustrated in FIG. 4C, a part of the ND filter 333 goes into the diaphragm aperture defined by the three blades, that is, the blades 321 and 322 of the first group and the second blade 331. However, the diameter of the aperture can be large. Thus, in such a case, the diffraction of light on an end surface of the ND filter 333 can have little influence on an image.

In a state illustrated in FIG. 4D, the diameter of the diaphragm aperture defined by the three blades, that is, the blades 321 and 322 of the first group and the second blade 331 is reduced still more. When the diameter of the diaphragm aperture is reduced still more, there is a fear that the diffraction of light due to the diaphragm aperture occurs, which is caused in the case of such a small diaphragm aperture. However, because of the use of the ND filter 333 covering the entire aperture, the third exemplary embodiment has an increased value of an obtained exposure compared with the case where the diaphragm aperture diameter has a smaller value, and where the ND filter is not used.

In a state illustrated in FIG. 4E, the aperture is completely covered with the blades 321 and 322 of the first group and the second blade 331.

Thus, the shapes of the driven parts 331a and 333a respectively corresponding to the second blade 331 and the ND filter 333 are appropriately set and are engaged with the engaging pin 322a of the first blade 322. With this configuration, the diaphragm aperture is defined by the three diaphragm blades 321, 322, and 331. Also, the ND filter 333 can be inserted into such a diaphragm aperture. Consequently, the diaphragm aperture can be shaped into a polygon or any other suitable (to cover the aperture) shape. Also, the range of exposure control can be widened.

According to the third exemplary embodiment, each of the driven parts 331a and 333a is formed like an elongated hole and engaged with the engaging pin 322a. Thus, the third exemplary embodiment can dispense with elastic members, which are provided in the first and second exemplary embodiments. Needless to say, it is possible that instead of forming each of the driven parts 331a and 333a like an elongated hole, elastic members for applying pushing forces to the blade 331 and the ND filter 333 are provided in the apparatus, and that the blade 331 and the ND filter 333 are pushed out by the engaging pins.

Incidentally, it is possible that the effective portion of the ND filter 333 is constituted by an ND filter material, instead of constituting the entire ND filter 333 by an ND filter material, and is stuck onto the blade (e.g., by bonding).

Fourth Exemplary Embodiment

FIGS. 5A to 5D illustrate views of an operation of a light quantity adjusting apparatus according to a fourth exemplary embodiment.

Figure 5A:
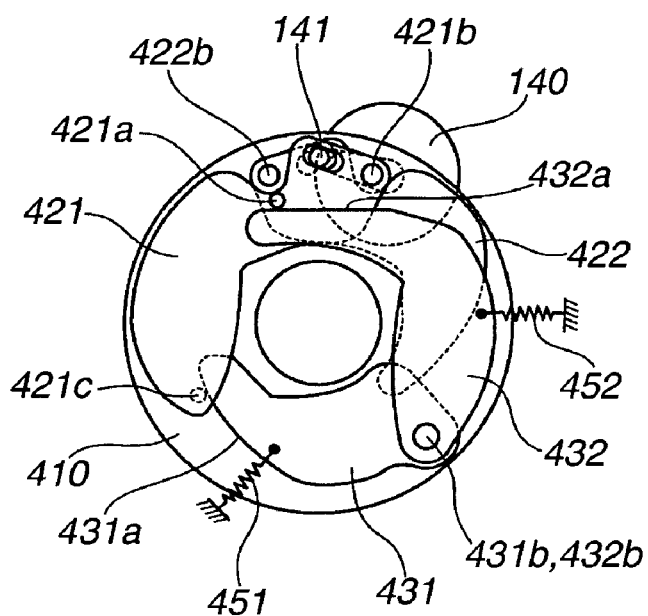
FIGS. 5A to 5D illustrate the operation of a light quantity adjusting apparatus according to a fourth exemplary embodiment.
Figure 5B:
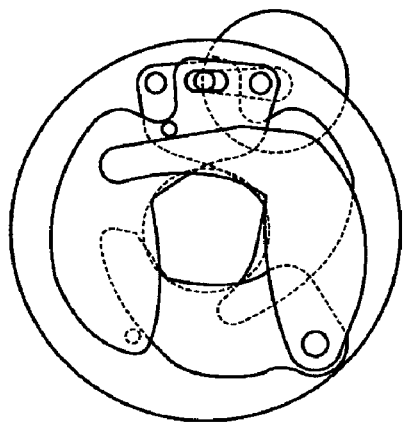
Figure 5C:
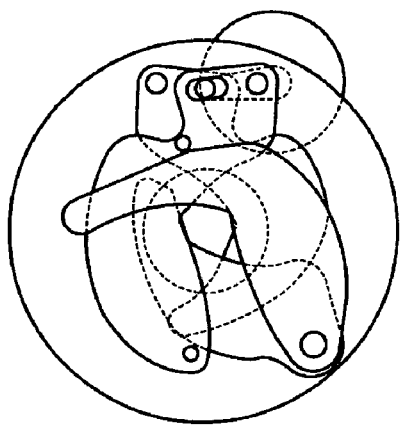
Figure 5D:
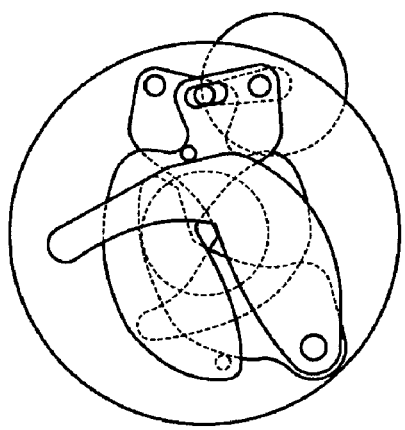

FIG. 5A illustrates a top view of the light quantity adjusting apparatus adapted so that the diameter of the aperture, defined by the diaphragm blades, is increased. FIG. 5B illustrates a top view of the light quantity adjusting apparatus at the start of narrowing the aperture. FIG. 5C illustrates a top view of the light quantity adjusting apparatus in a state in which the aperture is narrowed still more as compared with the aperture illustrated in FIG. 5B. FIG. 5D illustrates a top view of the light quantity adjusting apparatus in a state in which the aperture is narrowed still more as compared with the aperture illustrated in FIG. 5C.

The electromagnetic drive source 140 and the drive lever 141 of the fourth exemplary embodiment are similar to those of the first exemplary embodiment. Also, the fourth exemplary embodiment has a first group of two blades 421 and 422 and also has a second group of two blades 431 and 432.

The blades 422, 431, 421, and 432 are overlapped on a bottom board 410 in this order, although in other exemplary embodiments the orders can be changed. Two engaging pins 421a and 421c (e.g., plastic-molded, screwed in, glued) can be integrally connected with the blade 421. The engaging pin 421a provided near to the center of rotation protrudes in a direction opposite to the bottom board 410. The engaging pin 421c provided at an end of the blade 421 protrudes toward the bottom board 410. In other exemplary embodiments, when the order of the blades is changed, there also can be a change in the direction and number of engagement pins.

As illustrated in FIG. 5A, each of elastic members 451 and 452 is engaged with a corresponding one of the blades 431 and 432 of the second group and has a pulling force acting in a direction in which the corresponding blade 431 or 432 is opened, away from the center of the board 410. An outer edge 431a of the blade 431 and an outer edge 432a of the blade 432 abut against the engaging pins 421c and 421a of blade 421 of the first group, respectively. A pair of the supporting pins 421b and 422b for the first group of blades and another pair of the supporting pins 431b and 432b for the second group of blades are provided across the aperture of the bottom board 410.

When the electromagnetic drive source 140 is energized, and the drive lever 141 is turned anticlockwise (that is, driven toward the center of the bottom board 410), the blades 421 and 422 of the first group rotate in opposite directions and start moving in narrowing directions. Simultaneously, while the blades 431 and 432 of the second group are respectively caused by the elastic members 451 and 452 to tend to abut against the engaging pins 421c and 421a, the blades 431 and 432 start moving in the narrowing directions against the pulling forces of the elastic members 451 and 452.

Thus, a polygonal diaphragm aperture defined by four blades can be realized by (e.g., plastic-molding) a plurality of engaging pins integrated with the blade 421, where the other three blades can be constituted by thin plates in a conventional manner.

Although the center of rotation of the blade 431 and that of rotation of the blade 432 are set on a same axis in the fourth exemplary embodiment, the arrangement of the center of rotation of these blades is not limited to such arrangement. The center of rotation of the blade 431 may be set on an axis differing from another axis on which the center of rotation of the blade 432 is set. Incidentally, the arrangement of the centers of rotation of the blades 431 and 432 of the second group on a common axis, which is shown in FIGS. 5A to 5D, can increase dimensional control and space efficiency over the arrangement of the centers of rotation of these blades on different axes.

Although the engaging pins are provided in the first group of blades in each of the aforementioned embodiments, the configuration of the apparatus is not limited to such a configuration. The apparatus may be configured so that the engaging pins are provided in the second group of blades.

Incidentally, a direction, in which the elastic members 451 and 452 provide forces on the second group of blades, away from the center of the board 410, can vary, for example toward the center of the board 410 or another direction. In the apparatus, in which the engaging pins of the first group of blades are fitted into the driven parts provided in the second group of blades as illustrated in FIGS. 4A to 4E, an elastic member for eliminating backlash between the engaging pins and the driven parts may be provided.

Thus, according to at least a few of the aforementioned exemplary embodiments, there is no necessity for providing complex mechanism components (e.g., the diaphragm ring), in the apparatus so as to drive the plurality of blades. Consequently, the configuration of the apparatus can be simplified. Additionally, the plural independent paths for transmitting the driving force are provided in the apparatus, instead of a single path for transmitting a driving force. Thus, the accumulation of backlash between the engaging portions of the blades can be reduced. The blade members can be operated by reducing a loss in transmitting a driving force.

Plural members (e.g., the diaphragm blades and the ND filter), differing from one another in function can be operated by using a single drive source. Although some exemplary embodiments can use multiple drive sources for different blades.

Fifth Exemplary Embodiment

Figure 6:
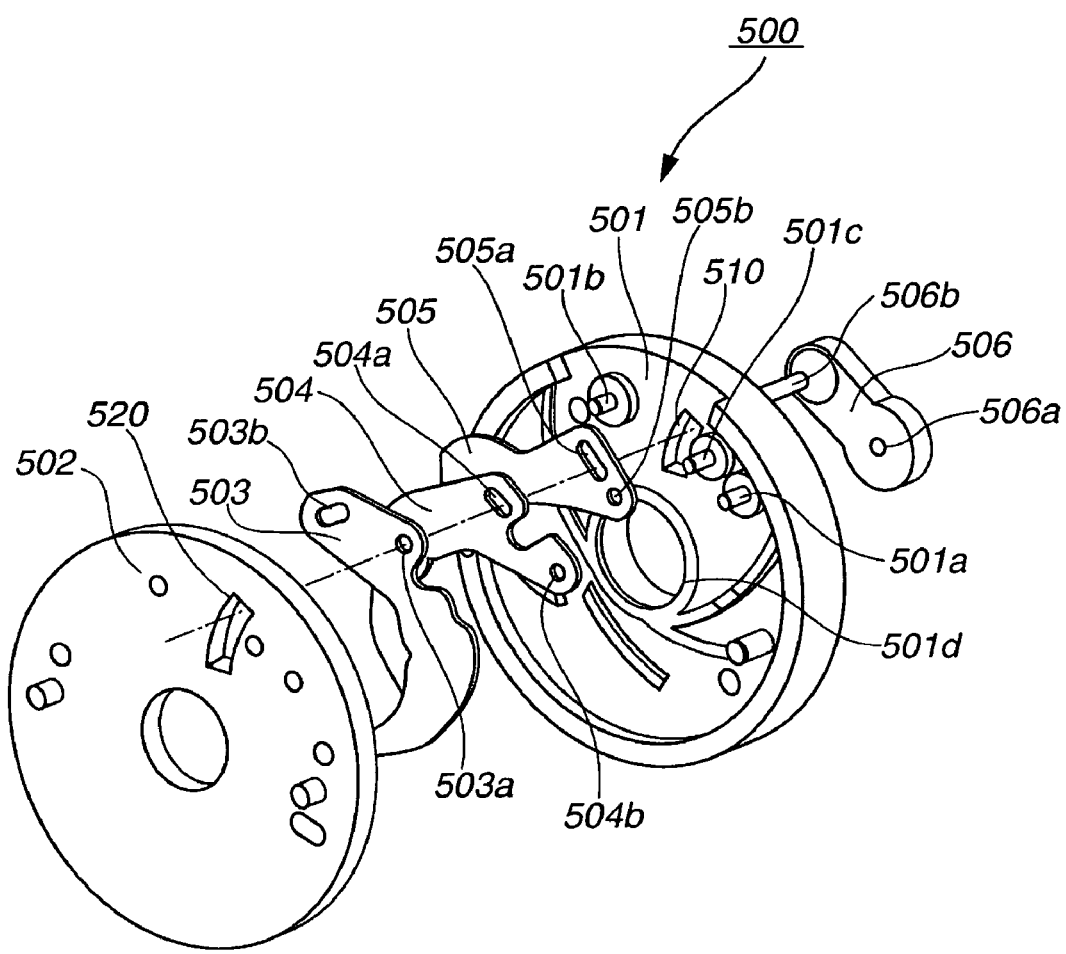
FIG. 6 illustrates an exploded perspective of a light quantity adjusting apparatus according to a fifth exemplary embodiment.

FIG. 6 illustrates an exploded perspective view of a light quantity adjusting apparatus according to a fifth exemplary embodiment.

Reference numeral 501 designates a bottom board serving as a supporting member having a cross-sectionally circular hole 501d through which light passes. Reference numeral 502 denotes a cover board serving as a cover for the bottom board 501. Reference numerals 503 and 504 designate diaphragm blades serving as light shielding members rotatably attached to the bottom board 501 through rotary central shafts (or first shafts) 501b and 501a provided on the bottom board 501 so as to obscure the hole 501d. Reference numeral 505 denotes an ND filter rotatably attached to the bottom board 501 through the rotary central shaft (or second shaft) 501c so as to cover the hole 501d. Reference numeral 506 designates a drive member simultaneously engaging with the diaphragm blades 503 and 504 and the ND filter 505 through a projection (or drive shaft) 506b so as to turn each of the diaphragm blades 503 and 504 and the ND filter 505 by predetermined angles of rotation. This light quantity adjusting apparatus further can have a drive source (not shown) engaging with a hole 506a of the drive member 506 and with an output shaft.

The bottom board 501 and the cover board 502 respectively have regulation holes 510 and 520, which regulate the movement locus of the projection 506b.

The diaphragm blades 503 and 504 have a hole 503a and an elongated hole 504a respectively, which engage with the projection 506b, and also have an elongated hole 503b and a hole 504b, which respectively engage with the rotary central shafts 501b and 501a provided on the bottom board 501. The ND filter 505 has an elongated hole 505a, which engages with the projection 506b, and also has a hole 505b, which engages with the rotary central shaft 501c provided on the bottom board 501. In at least one exemplary embodiment, the elongated hole 504a formed in the diaphragm blade 504 can be smaller than the elongated hole 505a formed in the ND filter 505.

With this configuration, the projection 506b moves along the regulation holes 510 and 520 while rotating around the hole 506a serving as the center of rotation thereof. As this projection 506b rotationally moves, each of the diaphragm blades 503 and 504 and the ND filter 505 rotate, so that the blades 503 and 504 and the ND filter 505 go back-and-forth in the region of the hole 501d of the bottom board 501. The size of the aperture, defined by the cross-section of the region between and including the cover 502 and bottom board 501 which allows light to pass, the largest value of which is defined by hole 501d, is substantially changed by causing the blades 503 and 504 to go back-and-forth. Consequently, the quantity of light passing through the aperture is changed.

The drive member 506 drives the diaphragm blade 504 and the ND filter 505 so that an angle of rotation (that is, a first angle of rotation) of the diaphragm blade 504 and an angle of rotation (that is, a second angle of rotation) of the ND filter 505 meet the following inequality (1).

(Angle of Rotation of the Diaphragm Blade 504)<
(Angle of Rotation of the ND filter 505)

That is, the drive member 506 causes the diaphragm blade 504 to rotate around the rotary central shaft 501a by a first angle of rotation. Simultaneously, the drive member 506 causes the ND filter 505 to rotate around the rotary central shaft 501c by a second angle of rotation, which is larger than the first angle of rotation.

Practically, the aforementioned inequality (1) holds in a case where the rotary central shafts 501a and 501c of the bottom board 501, which respectively engage with the hole 504b formed in the diaphragm blade 504 and with the hole 505b formed in the ND filter 505, are disposed so that the following inequality (2) holds.

(Distance between the Projection 506b and the Rotary Central Shaft 501a)>(Distance between the Projection 506b and the Rotary Central Shaft 501c)    (2)

That is, the distance between a predetermined position located on the movement locus of the projection 506b and the rotary central shaft 501a is larger than the distance between the predetermined position located on the movement locus of the projection 506b and the rotary central shaft 501c.

Figure 7A:
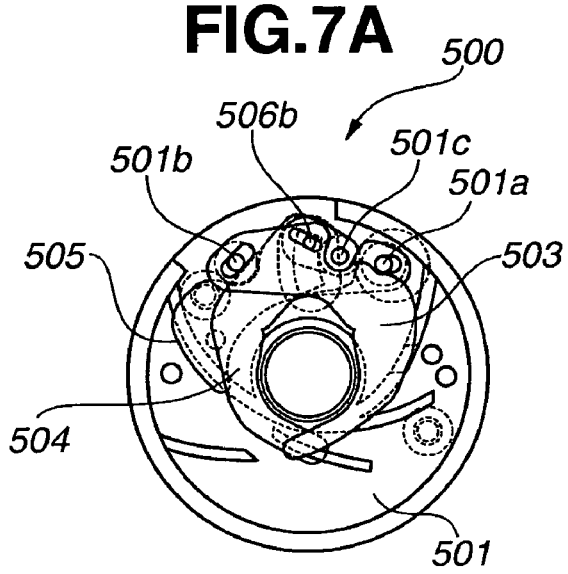
FIGS. 7A to 7E illustrate explanatory views of a narrowing operation performed when the state of an aperture shown in FIG. 6 is changed from an opened state to a closed state.
Figure 7D:
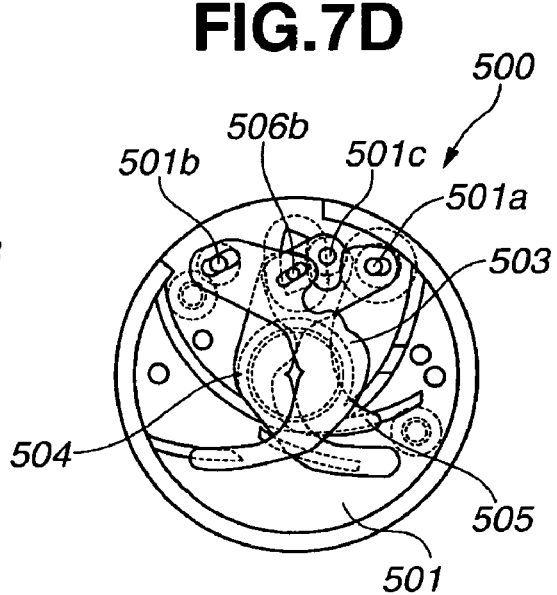
Figure 7B:
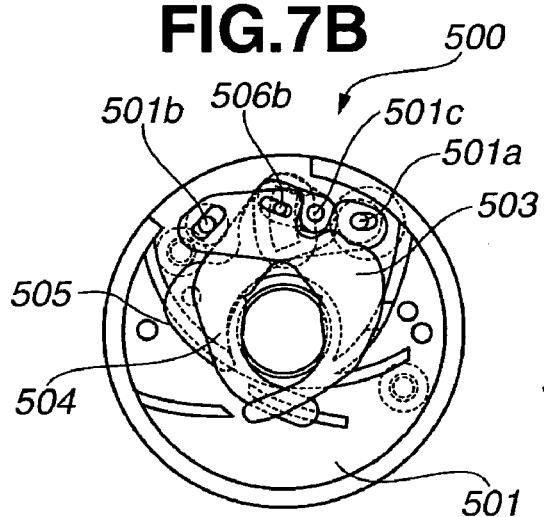
Figure 7E:
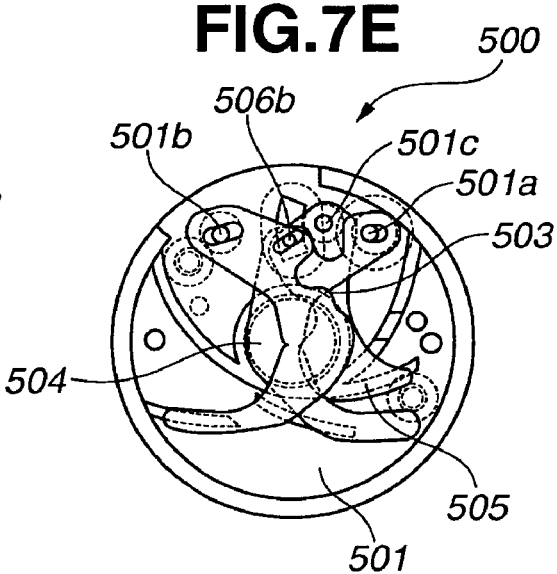
Figure 7C:
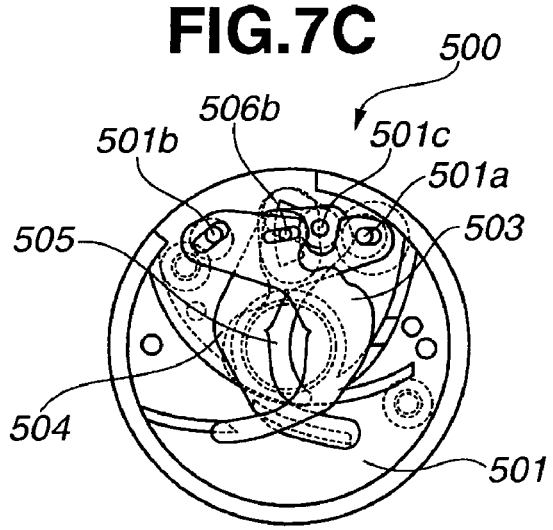
Figure 8:
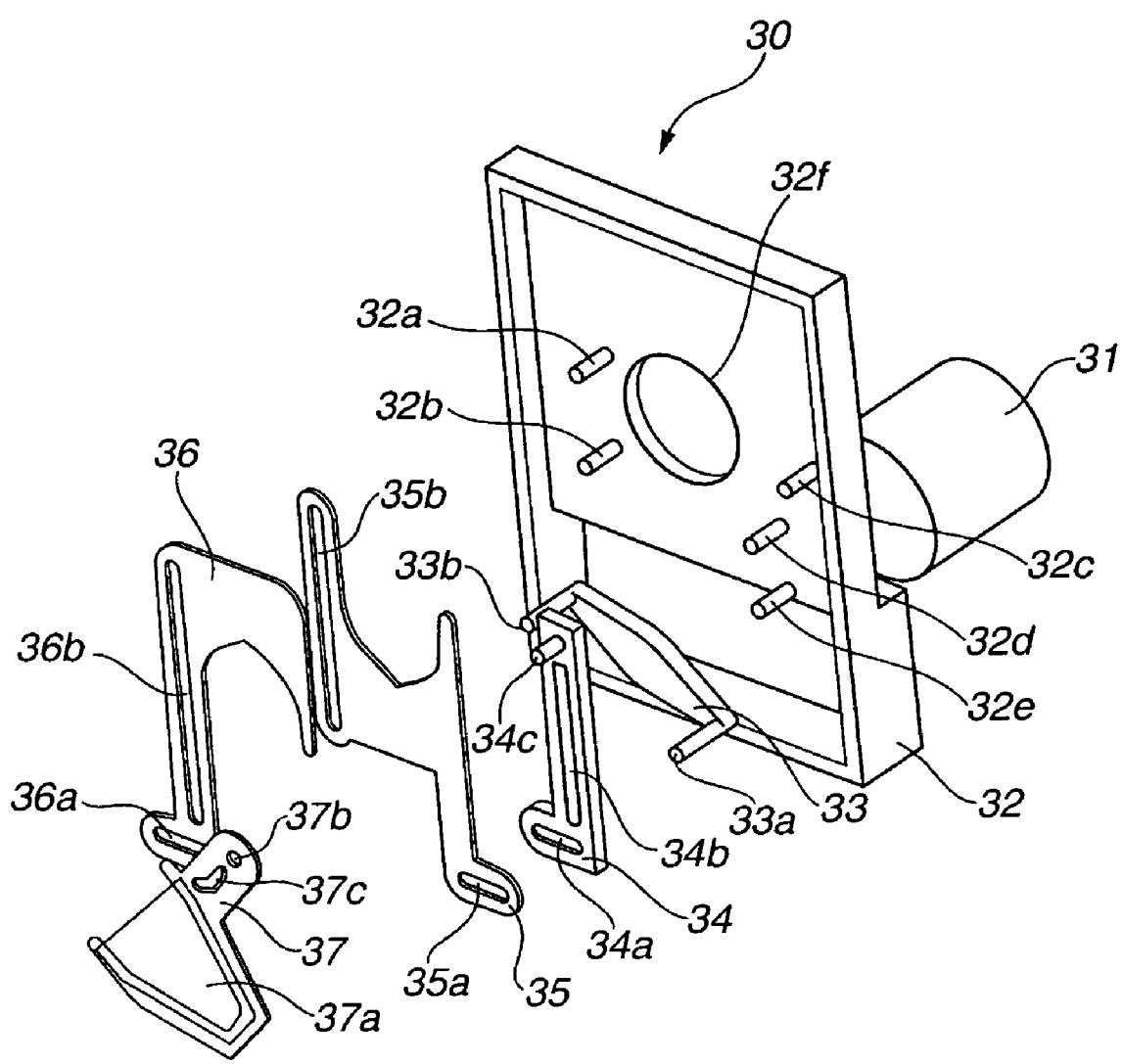
FIG. 8 illustrates an exploded perspective view of a conventional light quantity adjusting apparatus.
Figure 9A:
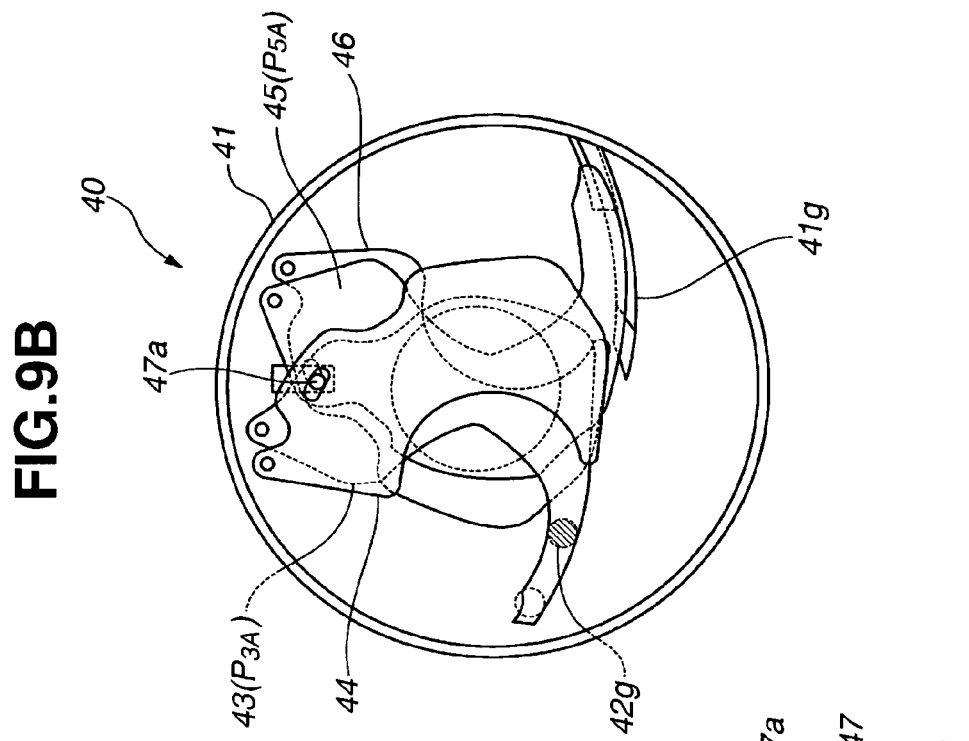
FIGS. 9A and 9B illustrate explanatory views of another conventional light quantity adjusting apparatus.
Figure 9B:
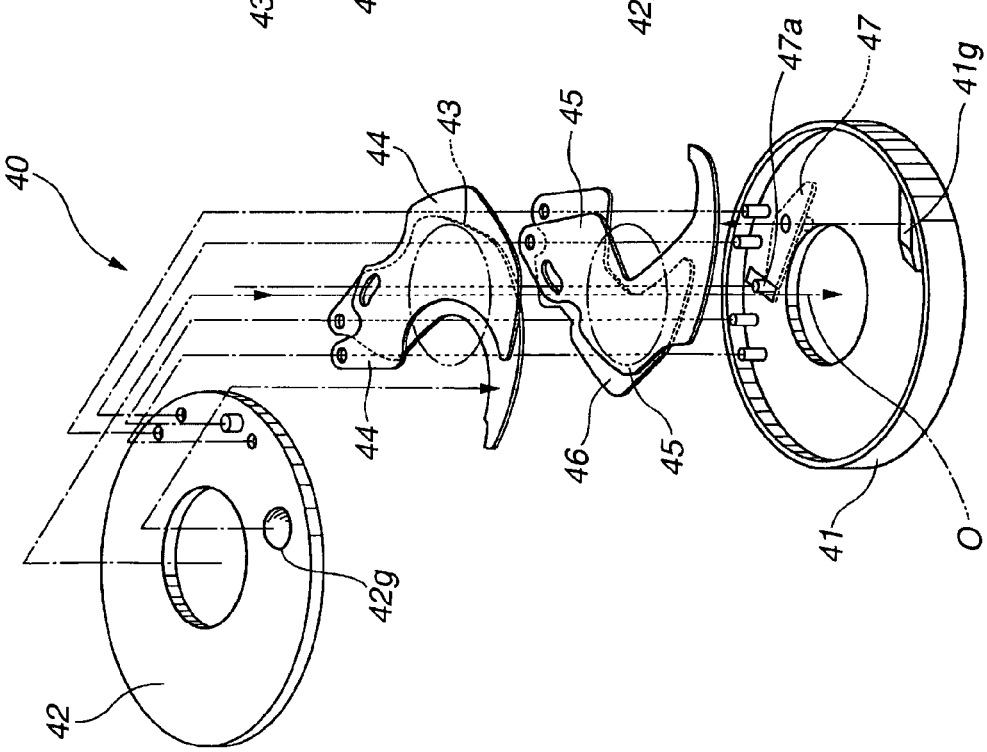
Figures 10A, 10B:
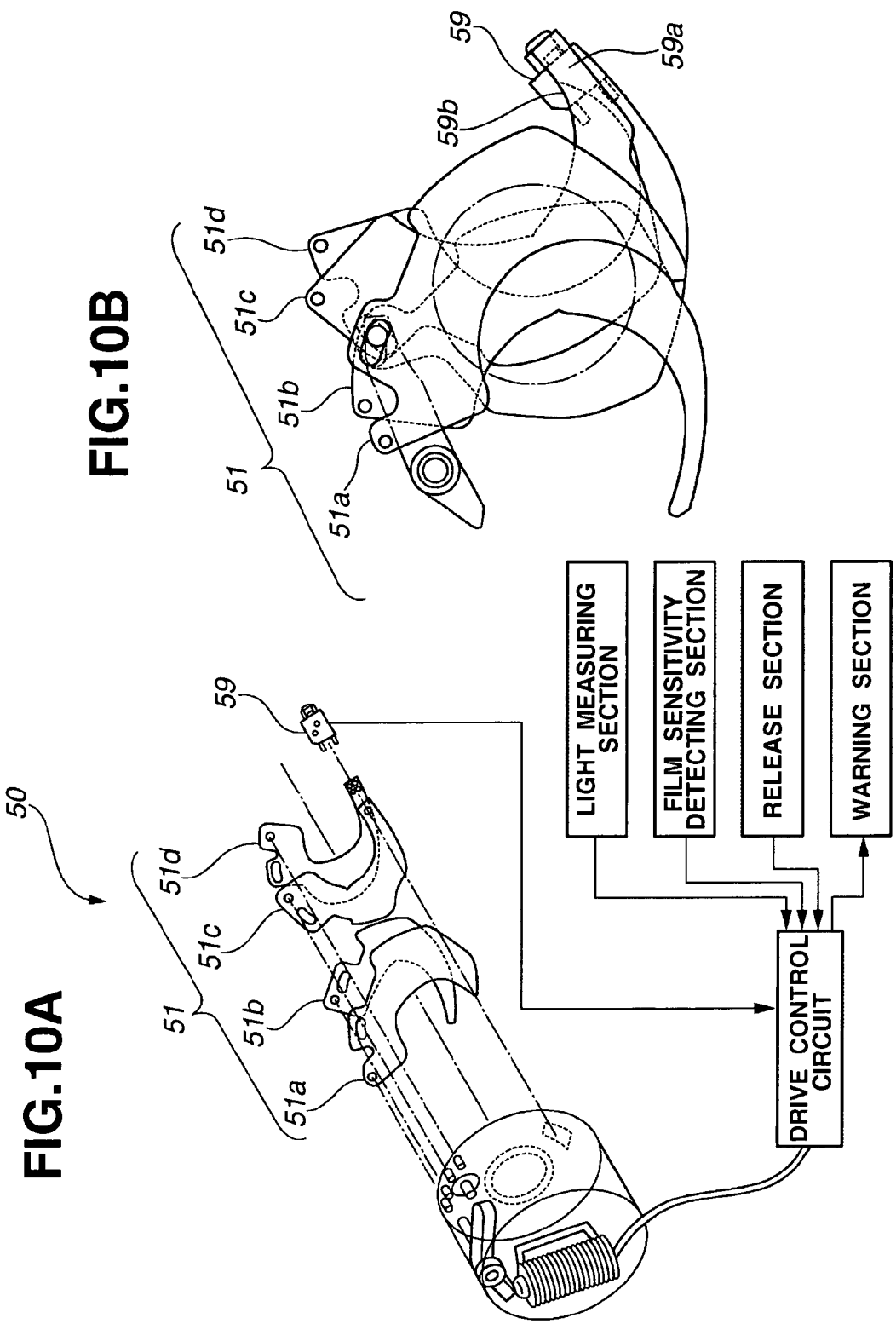
FIGS. 10A and 10B illustrate explanatory views of another conventional light quantity apparatus 50.

FIGS. 7A to 7E illustrate explanatory views showing a narrowing operation performed when the state of an aperture illustrated in FIG. 6 is changed from an opened state to a closed state. FIG. 7A illustrates the opened state. FIG. 7B illustrates a first stage of change to the closed state. FIG. 7C illustrates a second stage of change to the closed state. FIG. 7D illustrates a third stage of change to the closed state. FIG. 7E illustrates the closed state.

As the projection 506b rotationally moves, the light quantity adjusting apparatus performs the narrowing operation so that the state of the aperture 501d changes from the opened state to the closed state, as illustrated in FIGS. 7A to 7E in this order.

First, the two diaphragm blades 503 and 504 turn ahead of the ND filter 505 and decrease the aperture in the opened state shown in FIG. 7A, so that the diaphragm aperture shown in FIG. 7B is formed. Then, the projection 506b further rotationally moves. Thus, as shown in FIG. 7C, the ND filter 505 overtakes the diaphragm blade 504, so that the aperture is partially covered by the ND filter 505. Subsequently, in a state in which the two diaphragm blades 503 and 504 form a small diaphragm aperture as shown in FIG. 7D, the ND filter 505 completely covers the aperture. Then, finally, the two diaphragm blades 503 and 504 completely close the aperture, so that the aperture is in the closed state. What is called the "small diaphragm diffraction" can be reduced by performing this narrowing operation.

According to the fifth exemplary embodiment, the drive member 506 causes the diaphragm blade 504 to rotate around the rotary central shaft 501a by a first angle of rotation. Simultaneously, the drive member 506 causes the ND filter 505 to rotate around the rotary central shaft 501c by a second angle of rotation, which is larger than the first angle of rotation. Consequently, the apparatus can control timing with which the diaphragm blade 504 and the ND filter 505 close the aperture 501*d*. Thus, the miniaturization of the light quantity adjusting apparatus can be achieved. Also, the apparatus can reduce image deterioration due to the diffraction of light, which is caused in the case of the small diaphragm aperture.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from both Japanese Patent Application No. 2004-195700 filed Jul. 1, 2004, and Japanese Patent Application No. 2004-377893 filed Dec. 27, 2004, both of which are hereby incorporated by reference herein in their entirety.

What is claimed is:

1. A light quantity adjusting apparatus comprising:
    at least one first blade member configured to be driven by a drive source; and
    at least one second blade member having an engaging portion to be engaged with the first blade member, the second blade member moving when the first blade member moves,
    wherein the first blade member and the second blade member rotate in opposite directions in response to a driving force from the drive source,
    wherein as the first blade member is driven by the drive source, the first blade member and the second blade member are overlapped forming an aperture, wherein the movement of the first blade and the second blade members changes the size of the aperture and a quantity of light passing through the aperture, and
    wherein there are a plurality of first blade members and second blade members.

2. The light quantity adjusting apparatus according to claim 1, wherein the plurality of first blade members are driven by the single drive source.

3. A light quantity adjusting apparatus comprising:
    a first blade member configured to be driven by a drive source; and
    a plurality of second blade members each having an engaging portion to be engaged with the first blade member, the plurality of second blade members moving when the first blade member moves,
    wherein as the first blade member is driven by the drive source, the first blade member and the plurality of second blade members are overlapped forming an aperture, wherein the movement of the first blade and the plurality of second blade members changes the size of the aperture and a quantity of light passing through the aperture, wherein the plurality second blade members are engaged with different parts of the first blade member, respectively.

* * * * *